Patented June 13, 1939

2,162,276

UNITED STATES PATENT OFFICE 2,162,276

METHOD FOR THE PREPARATION OF CATALYSTS

John Morris Weiss, New York, N. Y., assignor to Calorider Corporation, Old Greenwich, Conn., a corporation of Connecticut No Drawing. Application October 20, 1936, Serial No. 106,571

10 Claims. (Cl. 23—234)

This invention deals with methods of catalyst preparation in general and is especially applicable to metallic oxide catalysts, the oxides being of such a nature that they will form salts with alkalies.

Such oxide catalysts are usually coated on carriers and one object of my invention is to produce coated carriers in which the coating is coherent and adherent so that the tendency of the catalyst to depreciate by dusting is minimized. A further object of my invention is to produce a coating which within itself is porous and hence produces a larger available surface for the catalytic action. A still further object is to so prepare the catalyst that all extraneous inorganic matter which might affect the efficiency of the catalyst unfavorably is rigidly excluded. Such extraneous matter may be introduced by the medium in which the oxide is applied to the carrier or may result from the corrosion of the enamel or porcelain vessels in which the catalyst is prepared, especially if strong acid conditions are present during the coating operation.

The invention will be specifically illustrated in the production of catalysts in which vanadium oxide is the chief active catalytic component but I do not intend to limit myself thereby, since it is obvious that the process can be applied to other oxides which have a similar acidic character to that possessed by vanadium oxide.

In the past there have been several methods of preparing vanadium solutions to be used as coatings on carriers. It has been common to employ solutions of ammonium meta-vanadate and evaporate these in contact with the carrier so as to deposit solids thereon. Ammonium meta vanadate is, however, not highly soluble in water and tends to crystallize from the solution during evaporation giving rise to uneven coatings and poor adherence. Moreover, when other substances are added to the solution to act as promoters or modifiers of the action of vanadium oxide, as for example ammonium molybdate, there is a tendency for the deposited solids to be heterogeneous so that the ratio of vanadium oxide to the added material will vary in different parts of the finished coating. Such heterogeneity does not conduce to the obtaining of optimum results in the catalytic operations for which the catalyst is used.

Another method employed has been to dissolve vanadium oxide or vanadic acid in hot concentrated hydrochloric acid so as to produce a solution of vanadyl chloride which can be evaporated to dryness without crystallization, this product forming a thick tarry solution in the last stages of the evaporation. In this way segregation may be avoided and an adherent coating obtained. In preparing catalysts in this way, corrosion of the porcelain or enamel vessels used for the coating operation may be quite severe, as the acid is held in contact with the surface of the vessel at elevated temperatures during the final drying operation. Often the combined effect of corrosion and abrasion introduces detrimental impurities into the catalyst composition which reduces its efficiency in use.

I have found that when vanadium oxide or vanadic acid is dissolved in aqueous solutions of certain amines, solutions are produced which are not corrosive to porcelain or the usual enamels, and which, when evaporated, form non-crystallizing solutions from which the vanadium compound is deposited evenly and is adherent to the carrier employed. Further, added materials, if used, are uniformly distributed in the catalytic coating so that all parts of the active catalyst are of like composition.

Example I

The following specific embodiment of my invention involves the preparation of a vanadium catalyst by the use of triethanolamine.

Purified hydrated vanadium oxide was prepared by dissolving 100 parts by weight of ammonium metavanadate in 3200 parts of hot distilled water. The solution was filtered and the filtrate treated at 70° C. with 10% nitric acid until faintly acid to Congo red. The acidified solution was boiled for two hours, adding nitric acid from time to time to maintain the acidity. The precipitate of purified hydrated vanadium oxide was then filtered off, washed free of acid, and dried at 100° C. On ignition it was found to contain approximately 90% of $V_2O_5$ (vanadium pentoxide).

Ten parts by weight of the purified oxide were suspended in 50 parts of boiling water and commercial triethanolamine (which contains water to the extent of about 1% and about 80% of actual triethanolamine along with varying amounts of mono and diethanolamines) was added until the vanadium oxide completely dissolved, this requiring about 16 parts by weight of the commercial triethanolamine. The resulting clear light olive green solution was added to 77 parts by weight of acid washed alundum granules and evaporated to dryness, stirring so as to coat the granules with the material. As evaporation proceeded, the solution became quite syrupy and showed no signs of crystallization. The granules became coated with a light colored coating which turned dark green on rather strong heating at the end to complete the expulsion of moisture. On continued heating to drive off organic matter, the granules were left with an even adherent porous black coating of a vanadium oxide.

This catalyst is suitable for the oxidation of benzene to maleic acid, naphthalene to phthalic anhydride, and like reactions. If desired, modifying agents may be added to the oxide or the amine or to the solution of oxide in the amine either before or during the evaporation in the presence of the carrier.

Example II

Five parts of hydrated vanadium oxide prepared as in Example I were dissolved in 25 parts of water and 3.5 parts of a 67% ethylene diamine solution. After heating to complete solution, 2 parts of ammonium molybdate were added. The product was a clear light brown solution. This was added to 39 parts of alundum granules and the solution evaporated and coated on the granules. The solution was thick and viscous at the end of the operation and the coating quite light in color until heated strongly when it turned to a dark purple color. This catalyst is adapted to the oxidation of benzene to maleic acid and to other similar oxidations. Instead of using ammonium molybdate, the corresponding quantity of precipitated molybdenum oxides may be used with an appropriate increase in the amount of ethylene diamine employed.

Although I have described my invention specifically with vanadium oxide, molybdenum oxide, and two specific amines, it is obvious that the process can be applied to other oxides or hydroxides, such as zinc oxide, tungstic oxide, chromic acid and the like, which form compounds with suitable organic amines. It can also be applied to mixtures of such oxides or to mixture of oxides and other materials. My invention is further not limited to the use of triethanolamine or diethylamine as other amines, which form non-crystallizing thick solutions with the chief oxide used may be employed. The amines which are suitable are alkaline and their alkali strength is sufficient to allow them to form compounds with the acidic oxides used as catalysts. Moreover, these compounds should be water soluble and should, on evaporation, form thick concentrated solutions, often like syrups, as the evaporation proceeds. It is not important if these solutions crystallize on cooling to low temperature as the utility lies in their character when at the temperature and concentration employed in coating the particles of carrier.

As further examples, such amines as triethylamine, mono and diethanolamines, pyridine, and hexamethylene tetramines will react with hydrated vanadium oxide to produce solutions of a suitable type for catalyst coatings. The invention is not limited to the use of alundum as a carrier and any other suitable carrier may be used.

The particular examples chosen produce catalysts suitable for the partial oxidation of certain organic compounds. Other compositions produced by similar methods may be used in the oxidation of sulphur dioxide to sulphur trioxide, in hydrogenation, dehydrogenation, synthesis of alcohols and hydrocarbons, or other catalytic processes.

Having thus described my invention, I claim:—

1. The process of producing a catalyst including the formation of an aqueous solution of a water soluble compound of an acidic metallic oxide and an alkaline water soluble amine, coating said solution on a carrier and heating said coated carrier to decompose said compound and leave a deposit of said metal oxide.

2. The process of producing a catalyst including the formation of an aqueous solution of a water soluble compound of a vanadium oxide and an alkaline water soluble amine, coating said solution on a carrier and heating said coated carrier to decompose said compound and leave a deposit of said vanadium oxide.

3. The process of producing a catalyst including the formation of an aqueous solution of a water soluble compound of a metallic oxide of the group consisting of oxides of vanadium, molybdenum, zinc, tungsten and chromium and an alkaline water soluble organic amine, coating said solution on a carrier and heating said coated carrier to decompose said compound and leave a deposit of said metal oxide.

4. The process of producing a catalyst including the formation of an aqueous solution of a water soluble compound of a molybdenum oxide and an alkaline water soluble amine, coating said solution on a carrier and heating said coated carrier to decompose said compound and leave a deposit of said molybdenum oxide.

5. The process of producing a catalyst including the formation of an aqueous solution of a water soluble compound of a zinc oxide and an alkaline water soluble amine, coating said solution on a carrier and heating said coated carrier to decompose said compound and leave a deposit of said zinc oxide.

6. The process of producing a catalyst including the formation of an aqueous solution of a water soluble compound of an acidic metallic oxide and triethanol amine, coating said solution on a carrier and heating said coated carrier to decompose said compound and leave a deposit of said metal oxide.

7. The process of producing a catalyst including the formation of an aqueous solution of a water soluble compound of a vanadium oxide and triethanol amine, coating said solution on a carrier and heating said coated carrier to decompose said compound and leave a deposit of said vanadium oxide.

8. In the production of catalysts, the steps comprising forming an aqueous solution of a water soluble compound of an acidic metallic oxide and an alkaline water soluble amine, and coating said solution on a carrier.

9. In the production of catalysts, the steps comprising forming an aqueous solution of a water soluble compound of a vanadium oxide and an alkaline water soluble amine and coating said solution on a carrier.

10. The process of producing a catalyst including dissolving hydrated vanadium oxide in a water solution of an alkaline organic amine, coating said solution on a carrier and heating said coated carrier so as to leave a deposit of vanadium oxide thereon.

JOHN MORRIS WEISS.